Jan. 5, 1932. J. HALTENBERGER 1,839,550
SLEEVE VALVE ENGINE
Original Filed April 12, 1926

Inventor
JULES HALTENBERGER,
By Schley Trask
Attorney

Patented Jan. 5, 1932

1,839,550

UNITED STATES PATENT OFFICE

JULES HALTENBERGER, OF INDIANAPOLIS, INDIANA, ASSIGNOR, BY MESNE ASSIGNMENTS, TO CONTINENTAL MOTORS CORPORATION, OF DETROIT, MICHIGAN, A CORPORATION OF VIRGINIA

SLEEVE-VALVE ENGINE

Original application filed April 12, 1926, Serial No. 101,301. Divided and this application filed June 7, 1928, Serial No. 283,711. Renewed June 12, 1931.

My invention is concerned with sleeve-valve engines and particularly with multi-cylinder sleeve valve engines of the type in which one or more sleeves surround each piston and extend thereabove into an annular space between the cylinder wall and the outer surface of a plug mounted in the head-end of the cylinder. Among the objects of my invention are to decrease gas leakage between this plug and the sleeve surrounding it, to prevent scoring of the co-operating surfaces of the sleeve and plug which would be caused either by the presence of foreign matter or by "gathering" of the metal on the co-operating surfaces of the sleeve and plug, to do this without the necessity for providing junk rings or other parts ordinarily used to form a seal for the upper end of the sleeve, and to locate the plug accurately with its axis coincident with that of the associated sleeve valve and cylinder bore.

I accomplish my objects by providing that surface of the cylinder plug which co-operates with the inner surface of the sleeve with a series of circumferential grooves or serrations.

Figure 1:
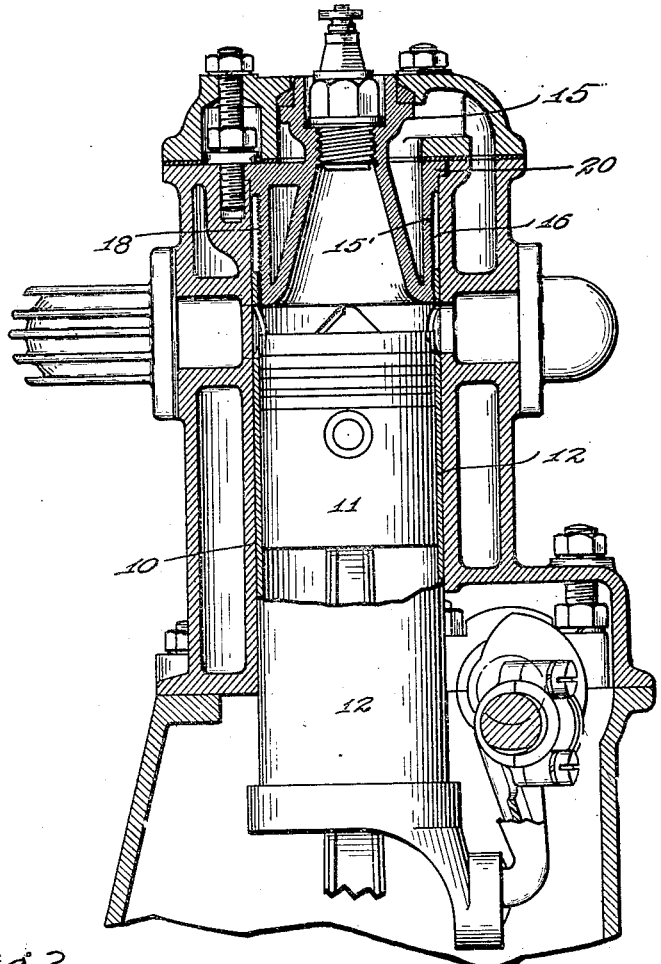
Figure 2:
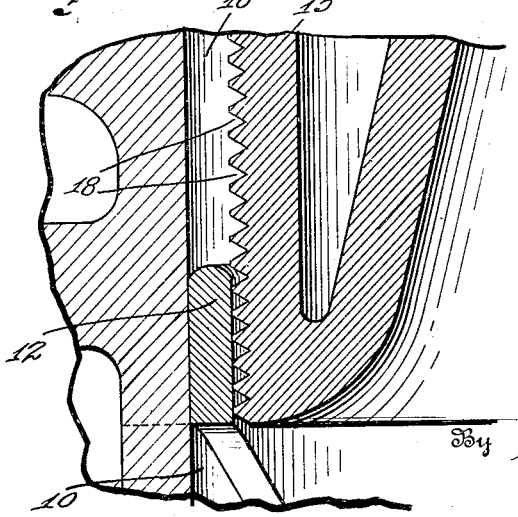

The accompanying drawings illustrate one cylinder of a multi-cylinder engine embodying my invention; Fig. 1 is an axial section through one cylinder of my engine; and Fig. 2 is a fragmental section, similar to Fig. 1 but on an enlarged scale.

The subject-matter of this application is disclosed in my co-pending application Serial No. 101,301, filed April 12, 1926, of which application the present one is a division.

Although my invention is not limited to single-sleeve valve engines, the engine illustrated in the drawings is of that type and has the usual cylinders 10, pistons 11, and sleeve valves 12, each sleeve valve lying within the associated cylinder 10 and surrounding the piston 11. The sleeve 12 may be driven by any suitable mechanism to control the flow of gases to and from the cylinder.

The head end of the cylinder bore is closed by a plug 15 which may be secured in position by any desired means and which has a portion 15′ extending for a distance into the cylinder. The plug portion 15′ is of smaller diameter than the cylinder bore to provide an annular space 16 into which the upper end of the sleeve valve 12 extends.

In carrying out my invention I am not compelled to rely upon the usual expedients, such as junk rings, which are employed to provide a seal and prevent gas leakage between the inner surface of the sleeve and outer surface of the plug 15. Instead, I contemplate that the sleeve will bear directly against the outer surface of the plug-portion 15′ as is clear from the drawings.

The outer surface of the plug portion 15′ is provided with a series of serrations, desirably in the form of circumferential grooves 18, which materially decrease the effective area of its working surface. Desirably, the ridges between the adjacent grooves 18 are V-shaped with a narrow land, so that in case of any inaccuracies in machining or assembling they readily wear away slightly to accommodate movements of the sleeve valve 12. In any event, I contemplate that the effective bearing area of the plug-portion 15′ will be but a fraction of what it would be if it were not grooved or serrated.

The grooves 18, in addition to reducing the effective area of the working surface of the plug portion 15′, also improve sealing, on account of the labyrinth packing which they provide. In addition, the interruption of the bearing surface prevents any "gathering" of the metal on the co-operating surface of the sleeve valve. Any foreign matter which finds its way between the plug and sleeve valve is deposited in one of the grooves or serrations 18 and therefore does not tend to cause scoring.

As no junk ring is provided in the construction illustrated, it is desirable that the plug 15 be located as accurately as possible in order that the plug portion 15′ may be closely concentric with the sleeve valve 12. To this end, I provide on the upper end of the plug 15, an outwardly projecting annular flange 20 having a lower surface accurately machined perpendicular to the axis of the plug portion 15′. At the upper end of the cylinder, I provide a mating surface which is accurately machined, as by a tool piloted from the cylinder bore, to be accurately perpendicular to the cylinder axis. Thus, for locating the plug 15, I do not rely upon the upper surface of the cylinder block, which is usually finished by a milling operation and which in practice, is always found to be somewhat out of perpendicularity with the axes of the cylinders. Such a surface, even if accurately plane, cannot, as a matter of fact, be perpendicular to the axes of all the cylinders in a block, as the axes of such cylinder bores are practically always out of parallelism to an extent. While this lack of perpendicularity between the cylinder axes and the milled upper surface of the cylinder block may be apparently slight, it nevertheless is frequently great enough to cause "cocking" of the plugs to an extent where binding of the sleeve valve would occur. The necessity for the provision of means for accurately locating the plug will be apparent when it is considered that the plug is not permanently mounted by the engine manufacturer but must be removed and replaced, frequently by unskilled labor, when carbon is removed from the engine.

The usual method of surmounting these difficulties is by the use of junk rings, but they are relatively expensive, are noisy when the engine is new, and become baked to the plug and hence ineffective when the engine is old. By my invention I eliminate the necessity of junk rings and their attendant expense, wear, and the leakage caused by this wear; I insure the absence of binding action; I provide a smaller friction surface and am thereby enabled to obtain easier starting in cold weather; I eliminate the possibility of scoring; and I do all this while still accomplishing an effective seal for the upper end of the sleeve valve owing to the labyrinth packing provided when the engine is new and to the carbon seal which is provided as the grooves or serrations become filled up. Further, my invention makes all the plugs of a multi-cylinder engine interchangeable.

I claim as my invention:

1. In a sleeve valve engine having a cylinder, a sleeve valve located within said cylinder, means for moving said sleeve valves with an axial component of motion, and a piston within said sleeve valve; a removable plug closing the head end of said cylinder and extending into said sleeve valve to engage frictionally the inner surface thereof, the circumferential surface of said plug which co-operates with the inner surface of said sleeve valve having a plurality of serrations.

2. In a sleeve valve engine having a cylinder, a sleeve valve located within said cylinder, means for moving said sleeve valve with an axial component of motion, and a piston within said sleeve valve; a removable plug closing the head-end of said cylinder and extending into said sleeve valve to engage frictionally the inner surface thereof, the circumferential surface of said plug which co-operates with the inner surface of said sleeve valve having a plurality of closely spaced circumferential grooves leaving between them narrow lands which form the effective bearing surface of said plug.

3. In a sleeve valve engine having a cylinder, a sleeve valve located within said cylinder, means for moving said sleeve valve with an axial component of motion, and a piston within said sleeve valve; a removable plug closing the head-end of said cylinder and extending into said sleeve valve to engage frictionally the inner surface thereof, the circumferential surface of said plug which co-operates with the inner surface of said sleeve valve having a plurality of circumferential grooves.

4. In a sleeve valve engine having a cylinder, a sleeve valve located within said cylinder, means for moving said sleeve valve with an axial component motion, and a piston within said sleeve valve; a removable plug closing the head-end of said cylinder and extending into said sleeve valve to engage frictionally the inner surface thereof, the circumferential surface of said plug which co-operates with the inner surface of said sleeve valve having a plurality of indentations reducing materially the effective bearing area of said plug.

5. In a sleeve valve engine having a cylinder, a sleeve valve located within said cylinder, means for moving said sleeve valve with a axial component of motion, and a piston within said sleeve valve; a removable member closing the upper end of said sleeve valve and having a circumferential surface frictionally engaging the inner surface of said sleeve valve, said member being provided in such circumferential surface with a plurality of indentations reducing materially the effective bearing area of said member.

6. In a sleeve valve engine having a cylinder, a sleeve valve located within said cylinder, means for moving said sleeve valve with an axial component of motion and a piston within said sleeve valve; a removable member closing the upper end of said sleeve valve and having a circumferential surface frictionally engaging the inner surface of said sleeve valve, said member being provided in such circumferential surface with a plurality of circumferential grooves.

7. In a sleeve valve engine having a cylinder block with a plurality of cylinder bores, a sleeve valve located within each of said cylinder bores, means for moving said sleeve valve with an axial component of motion, and a piston within each sleeve valve; a removable plug closing the head-end of each cylinder bore and extending into the associated sleeve valve to engage frictionally the inner surface thereof, each of said plugs being provided with an outwardly extending flange, and said cylinder block being provided around each cylinder bore with a surface accurately machined from that cylinder bore and adapted to support the flange of the associated plug to locate said plug with its axis accurately coincident with that of the cylinder bore, the circumferential surface of each of said plugs which co-operates with the associated sleeve valve having a plurality of indentations reducing materially the effective bearing area of said surface.

In witness whereof, I have hereunto set my hand at Indianapolis, Indiana, this 5th day of June, 1928.

JULES HALTENBERGER.